US012560956B2

(12) United States Patent
Hu et al.

(10) Patent No.: US 12,560,956 B2
(45) Date of Patent: Feb. 24, 2026

(54) VOLTAGE REGULATION CIRCUIT, DEVICE, AND METHOD

(71) Applicant: HUAWEI TECHNOLOGIES CO., LTD., Shenzhen (CN)

(72) Inventors: Zhangrong Hu, Shanghai (CN); Zhubiao Chan, Shanghai (CN); Tianyu Yang, Shenzhen (CN); Zhuomin Zhou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 350 days.

(21) Appl. No.: 18/183,176

(22) Filed: Mar. 14, 2023

(65) Prior Publication Data

US 2023/0213957 A1 Jul. 6, 2023

Related U.S. Application Data

(63) Continuation of application No. PCT/CN2020/116596, filed on Sep. 21, 2020.

(51) Int. Cl.

| | |
|---|---|
| ***G05F 1/575*** | (2006.01) |
| ***G05F 1/46*** | (2006.01) |
| ***G05F 1/59*** | (2006.01) |

(52) U.S. Cl.
CPC .............. *G05F 1/575* (2013.01); *G05F 1/468* (2013.01); *G05F 1/59* (2013.01)

(58) Field of Classification Search
CPC . G05F 1/46; G05F 1/461; G05F 1/462; G05F 1/465; G05F 1/468; G05F 1/56;
(Continued)

(56) References Cited

U.S. PATENT DOCUMENTS

| | | | | |
|---|---|---|---|---|
| 7,274,114 B1 * | 9/2007 | Wong | G05F 1/56 307/72 |
| 9,001,572 B2 | 4/2015 | Choi et al. | |

(Continued)

FOREIGN PATENT DOCUMENTS

| | | |
|---|---|---|
| CN | 104104343 A | 10/2014 |
| CN | 207218368 U | 4/2018 |

(Continued)

*Primary Examiner* — Thienvu V Tran
*Assistant Examiner* — Carlos O Rivera-Perez

(57) ABSTRACT

A voltage regulation circuit, device, and method are disclosed, which relate to the field of electronic technologies, to reduce a voltage regulation time, and improve a system response and user experience. The voltage regulation circuit (1) includes: a first power supply circuit (11), configured to receive a voltage setting signal ($S_{SET}$), and output a first supply voltage (V1) and a second reference voltage ($V_{REF2}$) according to the voltage setting signal ($S_{SET}$) and a difference between a first feedback voltage ($V_{F1}$) and a second feedback voltage ($V_{F2}$), where the first feedback voltage ($V_{F1}$) is used to indicate the first supply voltage (V1), and the second feedback voltage ($V_{F2}$) is used to indicate a (Continued)

second supply voltage (V2); and a second power supply circuit (12), configured to output the second supply voltage (V2) based on the second reference voltage ($V_{REF2}$).

14 Claims, 6 Drawing Sheets

(58) Field of Classification Search
CPC .......... G05F 1/562; G05F 1/563; G05F 1/565; G05F 1/575; G05F 1/577; G05F 1/59; G05F 1/595; G05F 1/62; G06F 1/00; G06F 1/26; G06F 1/32; G06F 1/3203; G06F 1/3234; G06F 1/3296; H02M 3/02; H02M 3/04; H02M 3/10; H02M 3/145; H02M 3/155; H02M 3/1552; H02M 3/156; H02M 3/1566; H02M 3/157; H02M 3/158; H02M 3/1582; H02M 3/1584; H02M 3/1588; H02M 1/0003; H02M 1/0016; H02M 1/0019; H02M 1/0025; H02M 1/0032; H02M 1/0067; G11C 5/00; G11C 5/14; G11C 5/141; G11C 5/144; G11C 5/145; G11C 5/147; G11C 5/148
USPC ........ 323/223–226, 266, 268–275, 280–285, 323/304, 311–317, 351; 363/65, 123, 363/124, 147
See application file for complete search history.

(56) References Cited

U.S. PATENT DOCUMENTS

| | | | | |
|---|---|---|---|---|
| 2004/0113497 | A1 | 6/2004 | May | |
| 2012/0201019 | A1 | 8/2012 | Chung et al. | |
| 2014/0097694 | A1 | 4/2014 | Ecker et al. | |
| 2015/0234452 | A1 * | 8/2015 | Heo .......................... | G06F 1/26 713/320 |

FOREIGN PATENT DOCUMENTS

| | | | |
|---|---|---|---|
| CN | 110462962 | A | 11/2019 |
| CN | 111179870 | A | 5/2020 |
| CN | 111312186 | A | 6/2020 |
| EP | 0624944 | A2 | 11/1994 |
| WO | 2018003269 | A1 | 1/2018 |

* cited by examiner

VOLTAGE REGULATION CIRCUIT, DEVICE, AND METHOD

CROSS-REFERENCE TO RELATED APPLICATIONS

This is a continuation of International Application No. PCT/CN2020/116596, filed on Sep. 21, 2020, the disclosure of which is hereby incorporated by reference in its entirety.

TECHNICAL FIELD

This relates to the field of electronic technologies, and in particular, to a voltage regulation circuit, device, and method.

BACKGROUND

Dynamic voltage scaling (DVS) is a technology that dynamically regulates a voltage of each power domain of a chip based on a load of each power domain. To minimize power consumption of the chip, a supply voltage of each power domain of the chip needs to be minimized while a running requirement of the chip is met. For a typical processor load, as shown in an upper part of FIG. 1, ideally, it is an optimal state that a supply voltage is close to a required voltage. However, in an actual case, due to impact of a voltage regulation speed, it is difficult for the supply voltage to accurately track the required voltage, which results in a waste of energy efficiency. Details are shown in a lower part of FIG. 1.

For a processor system including a logic circuit and a storage circuit, to implement a low power consumption design, the system usually supplies power to the logic circuit and the storage circuit separately. A supply voltage $V_C$ of the logic circuit may be regulated according to an operating frequency to optimize the energy efficiency, and a supply voltage $V_M$ of the storage circuit generally has a small voltage range and cannot be reduced. Because there is a voltage difference constraint between the $V_M$ and the $V_C$, the $V_M$ also needs to be regulated in a voltage regulation process of the $V_C$.

In a conventional technology, when voltage regulation is performed on the $V_C$ and the $V_M$, the voltage regulation is generally implemented through multi-step alternating regulation, that is, the $V_C$ and the $V_M$ are sequentially and alternately regulated, to ensure that the $V_C$ and the $V_M$ meet a voltage difference constraint in a regulation process until the voltage is regulated to a required voltage. For example, as shown in FIG. 2, an initial voltage of the $V_C$ is 0.6 V, a required voltage is 1 V, an initial voltage of the $V_M$ is 0.8 V, and the voltage difference constraint is that the $V_M$-$V_C$ falls within a range of [0, 0.2 V]. In this case, a multi-step alternating voltage regulation process may be: regulating the $V_C$ from 0.6 V to 0.8 V within a time t1, then regulating the $V_M$ from 0.8 V to 1 V within a time t2, and finally regulating the $V_C$ from 0.8 V to 1 V. In the figure, ts represents a communication time for performing regulation control, and a time between t1 and t2 and a time between t2 and t3 are time required for each round of voltage regulation of the processor system to succeed.

However, when voltage regulation is performed on the $V_C$ and the $V_M$ by using the method, if the $V_C$ regulation amplitude is large, for example, the $V_C$ is regulated from 0.6 V to 3 V, the foregoing regulation process is time-consuming due to existence of the voltage difference constraint between the $V_M$ and the $V_C$, which results in a response delay.

SUMMARY

This disclosure provides a voltage regulation circuit, device, and method, to reduce a voltage regulation time, and improve a system response and user experience. To achieve the foregoing objective, the following technical solutions are used in embodiments of this disclosure.

According to a first aspect, a voltage regulation circuit is provided, including: a first power supply circuit, configured to receive a voltage setting signal, and output a first supply voltage and a second reference voltage according to the voltage setting signal and a difference between a first feedback voltage and a second feedback voltage, where the first feedback voltage is used to indicate the first supply voltage, and the second feedback voltage is used to indicate a second supply voltage; and a second power supply circuit, configured to convert the second reference voltage into the second supply voltage.

Optionally, there is an association relationship between the difference between the first feedback voltage and the second feedback voltage and the difference between the first supply voltage and the second supply voltage, for example, a positive correlation relationship or a linear relationship. The difference between the first feedback voltage and the second feedback voltage falling within a preset range can ensure that the difference between the first supply voltage and the second supply voltage falls within a specific preset range, for example, a voltage difference constraint range.

In the foregoing technical solution, regulation of the first supply voltage is constrained by the difference between the first feedback voltage and the second feedback voltage. Because there is an association relationship between the difference between the first feedback voltage and the second feedback voltage and the difference between the first supply voltage and the second supply voltage, and the second reference voltage used to generate the second supply voltage is generated by the first power supply circuit, the second supply voltage may change with regulation of the first supply voltage, and the difference between the first feedback voltage and the second feedback voltage is used to constrain regulation of the first supply voltage, to ensure that the difference between the first supply voltage and the second supply voltage falls within the voltage difference constraint range, thereby ensuring continuity of voltage regulation, reducing a voltage regulation time, and improving a system response and user experience.

In a possible implementation of the first aspect, the first feedback voltage is equal to the first supply voltage, and the second feedback voltage is equal to the second supply voltage. Therefore, the difference between the first feedback voltage and the second feedback voltage is the difference between the first supply voltage and the second supply voltage.

In a possible implementation of the first aspect, the first power supply circuit includes: a hysteresis comparator, configured to output a first control signal based on the difference between the first feedback voltage and the second feedback voltage, where the first control signal includes a first signal or a second signal, the first signal is used to indicate that the difference between the first feedback voltage and the second feedback voltage falls within a preset difference range, and the second signal is used to indicate that the difference between the first feedback voltage and the second feedback voltage exceeds the preset difference range;

a voltage setting circuit, configured to set a first reference signal according to the voltage setting signal when the first control signal is the first signal, or latch the first reference signal when the first control signal changes from the first signal to the second signal; a conversion circuit, configured to convert the first reference voltage to the first supply voltage; and an analog operation circuit, configured to output the second reference voltage based on the first reference voltage or the first feedback voltage, where the first reference voltage or the first feedback voltage may be in a positive correlation relationship or a linear relationship with the second reference voltage in a voltage regulation phase, that is, the second reference voltage increases as the first reference voltage or the first feedback voltage increases, and decreases as the first reference voltage or the first feedback voltage decreases. In the foregoing possible implementation, in a process of regulating the first supply voltage by the first power supply circuit, regulation of the first supply voltage is constrained by the difference between the first feedback voltage and the second feedback voltage, to ensure that the first supply voltage and the second supply voltage meet the voltage difference constraint. In addition, the second reference voltage is output based on the first reference voltage or the first feedback voltage, so that the second reference voltage changes with a change of the first reference voltage or the first feedback voltage. Therefore, when the second supply voltage is output based on the second reference voltage, trackability of regulation of the second supply voltage can be ensured.

In a possible implementation of the first aspect, the voltage setting circuit includes: a digital voltage generation circuit, configured to generate a digital voltage according to the voltage setting signal when the first control signal is the first signal, or latch a digital voltage when the first control signal changes from the first signal to the second signal; and a digital-to-analog converter, configured to convert the digital voltage into an analog voltage, to obtain the first reference voltage. In the foregoing possible implementation, if the difference between the first supply voltage and the second supply voltage exceeds or is about to exceed the voltage difference constraint range, a previous digital voltage may be latched, that is, regulation of the first supply voltage is suspended, and the first supply voltage continues to be regulated after the second supply voltage is properly regulated, to regulate the first supply voltage and the second supply voltage in a linked manner, and ensure that the difference between the first supply voltage and the second supply voltage falls within the voltage difference constraint range, thereby ensuring continuity of voltage regulation, reducing a voltage regulation time, and improving a system response and user experience.

In a possible implementation of the first aspect, the analog operation circuit includes a comparator and a multiplexer, where the comparator is configured to compare the first reference voltage with a preset voltage to output a second control signal, where the second control signal includes a third signal or a fourth signal, for example, output the third signal when the preset voltage is less than or equal to the first reference voltage, or output the fourth signal when the preset voltage is greater than the first reference voltage; and a multiplexer, configured to: select a difference between the first reference voltage and an offset voltage as the second reference voltage when the second control signal is the third signal, or select a fixed voltage as the second reference voltage when the second control signal is the fourth signal. In the foregoing possible implementation, when the preset voltage is less than or equal to the first reference voltage, the difference between the first reference voltage and the offset voltage is selected as the second reference voltage (in this case, there is a linear relationship between the first reference voltage and the second reference voltage); or when the preset voltage is greater than the first reference voltage, the fixed voltage is selected as the second reference voltage. In this way, the second supply voltage output based on the second reference voltage is always a minimum value within a required range, thereby minimizing power consumption.

In a possible implementation of the first aspect, the analog operation circuit includes: an operational amplifier, a first resistor, a second resistor, a third resistor, and a variable resistor, where an end of the first resistor is coupled to a negative input terminal of the operational amplifier, an end of the second resistor is coupled to a positive input terminal of the operational amplifier, the third resistor is coupled between the negative input terminal of the operational amplifier and an output terminal of the operational amplifier, and the variable resistor is coupled between the positive input terminal of the operational amplifier and the ground terminal; and the other end of the first resistor is configured to receive the first reference voltage, the other end of the second resistor is configured to receive the offset voltage, and the output terminal of the operational amplifier is configured to output the second reference voltage. The analog operation circuit provided in the foregoing possible implementation is simple and effective, and the first reference voltage and the second reference voltage are in a linear relationship.

According to a second aspect, a voltage regulation device is provided. The voltage regulation device includes the voltage regulation circuit according to any one of the first aspect or the possible implementations of the first aspect, and a processor coupled to the voltage regulation circuit. The processor is configured to generate a voltage setting signal, and the voltage setting signal may include a required voltage and a voltage regulation speed. In the foregoing possible implementation, the processor may configure the voltage setting signal for the voltage regulation circuit based on a load status, so that the voltage regulation circuit properly regulates a voltage, thereby ensuring continuity of voltage regulation, reducing a voltage regulation time, and improving a response speed of the processor and user experience.

In a possible implementation of the second aspect, the processor includes a storage circuit and a logic circuit, a first supply voltage is used to supply power to the logic circuit, and a second supply voltage is used to supply power to the storage circuit. In the foregoing possible implementation, normal power supply to the logic circuit and the storage circuit in the processor can be ensured, thereby improving a system response and user experience.

In a possible implementation of the second aspect, the processor is a system on chip (SoC).

According to a third aspect, a chip system is provided. The chip system includes a system on chip SoC and a power supply chip that supplies power to the SoC. The power supply chip includes the voltage regulation circuit according to any one of the first aspect or the possible implementations of the first aspect.

According to a fourth aspect, an electronic device is provided. The electronic device includes a circuit board, the circuit board includes a system on chip (SoC) and a power supply chip that supplies power to the SoC, and the power supply chip includes the voltage regulation circuit according to any one of the first aspect or the possible implementations of the first aspect.

According to a fifth aspect, a voltage regulation method is provided. The method is applied to a voltage regulation circuit, and includes: receiving a voltage setting signal, and outputting a first supply voltage and a second reference voltage according to the voltage setting signal and a difference between a first feedback voltage and a second feedback voltage, where the first feedback voltage is used to indicate the first supply voltage, and the second feedback voltage is used to indicate a second supply voltage; and converting the second reference voltage into the second supply voltage.

In a possible implementation of the fifth aspect, there is an association relationship between the difference between the first feedback voltage and the second feedback voltage and a difference between the first supply voltage and the second supply voltage, for example, the difference between the first feedback voltage and the second feedback voltage falling within a preset range can ensure that the difference between the first supply voltage and the second supply voltage falls within a specific preset range. Optionally, the first feedback voltage is equal to the first supply voltage, and the second feedback voltage is equal to the second supply voltage. Therefore, the difference between the first feedback voltage and the second feedback voltage is the difference between the first supply voltage and the second supply voltage.

In a possible implementation of the fifth aspect, the outputting a first supply voltage and a second reference voltage according to the voltage setting signal and a difference between a first feedback voltage and a second feedback voltage includes: outputting a first control signal based on the difference between the first feedback voltage and the second feedback voltage, where the first control signal includes a first signal or a second signal, the first signal is used to indicate that the difference between the first feedback voltage and the second feedback voltage falls within a preset difference range, and the second signal is used to indicate that the difference between the first feedback voltage and the second feedback voltage exceeds the preset difference range; setting the first reference signal according to the voltage setting signal when the first control signal is the first signal, or latching the first reference signal when the first control signal changes from the first signal to the second signal; converting a first reference voltage into the first supply voltage; and outputting the second reference voltage based on the first reference voltage or the first feedback voltage, where the first reference voltage or the first feedback voltage is positively correlated with the second reference voltage, that is, the second reference voltage increases as the first reference voltage or the first feedback voltage increases, and decreases as the first reference voltage or the first feedback voltage decreases.

In a possible implementation of the fifth aspect, when the first control signal is the first signal, a digital voltage is generated according to the voltage setting signal, or when the first control signal changes from the first signal to the second signal, the digital voltage is latched; and the digital voltage is converted into an analog voltage, to obtain the first reference voltage.

In a possible implementation of the fifth aspect, the outputting the second reference voltage based on the first reference voltage or the first feedback voltage includes: comparing the first reference voltage with a preset voltage, to output a second control signal, where the second control signal includes a third signal or a fourth signal, for example, output the third signal when the preset voltage is less than or equal to the first reference voltage, or output the fourth signal when the preset voltage is greater than the first reference voltage; and selecting a difference between the first reference voltage and an offset voltage as the second reference voltage when the second control signal is the third signal, or selecting a fixed voltage as the second reference voltage when the second control signal is the fourth signal.

In a possible implementation of the fifth aspect, the voltage regulation circuit is coupled to a processor, and the method further includes: generating a voltage setting signal. For example, the voltage setting signal may include a required voltage and a voltage regulation speed.

In a possible implementation of the fifth aspect, the voltage regulation circuit is coupled to a processor, the processor includes a storage circuit and a logic circuit, the first supply voltage is used to supply power to the logic circuit, and the second supply voltage is used to supply power to the storage circuit.

In a possible implementation of the fifth aspect, the processor is a system on chip (SoC).

It can be understood that any voltage regulation device, chip system, voltage regulation method, or the like provided above is used to perform a function of a corresponding voltage regulation circuit provided above. Therefore, for beneficial effects that can be achieved by the voltage regulation device, the chip system, the voltage regulation method, or the like, reference may be made to beneficial effects of the corresponding voltage regulation circuit provided above. Details are not described herein again.

DESCRIPTION OF EMBODIMENTS

In this disclosure, “at least one” means one or more, and “a plurality of” means two or more. “And/or” describes an association relationship between associated objects, and represents that three relationships may exist. For example, A and/or B may represent the following cases: Only A exists, both A and B exist, and only B exists, where A and B may be singular or plural. At least one of the following items (pieces) or a similar expression thereof indicates any combination of these items, including a single item (piece) or any combination of a plurality of items (pieces). For example, "at least one of a, b, or c" may represent "a, b, c, a, and b", "a and c", "b and c" or "a, b, and c", where a, b, and c may be singular or plural.

In embodiments of this disclosure, words such as "first" and "second" are used to distinguish between objects with similar names, functions or effects. A person skilled in the art may understand that the words such as "first" and "second" do not limit a quantity and an execution sequence. The term "coupling" is used to represent an electrical connection, including a direct connection by using a wire or a connection end or an indirect connection by using another device. Therefore, "coupling" should be considered as a generalized electronic communication connection.

The technical solutions provided in embodiments of this disclosure may be applied to various electronic devices that require dynamic voltage scaling. The dynamic voltage scaling is a technology that dynamically regulates a voltage of each power domain of a chip based on a load of each power domain. To minimize power consumption of the chip, a supply voltage of each power domain of the chip needs to be minimized while a running requirement of the chip is met. Specifically, for a typical processor load, when the processor load is light, a supply voltage of the processor is reduced; or when the processor load is large, a supply voltage of the processor is increased, to reduce power consumption of the processor.

The electronic device may include but is not limited to a personal computer, a server computer, a handheld or laptop device, a mobile device (for example, a hand phone, a mobile phone, a tablet computer, a personal digital assistant, or a media player), a wearable device, an in-vehicle device, a consumer electronic device, a minicomputer, a mainframe computer, a mobile robot, or a drone. The following describes a specific structure of the electronic device.

Figure 3:
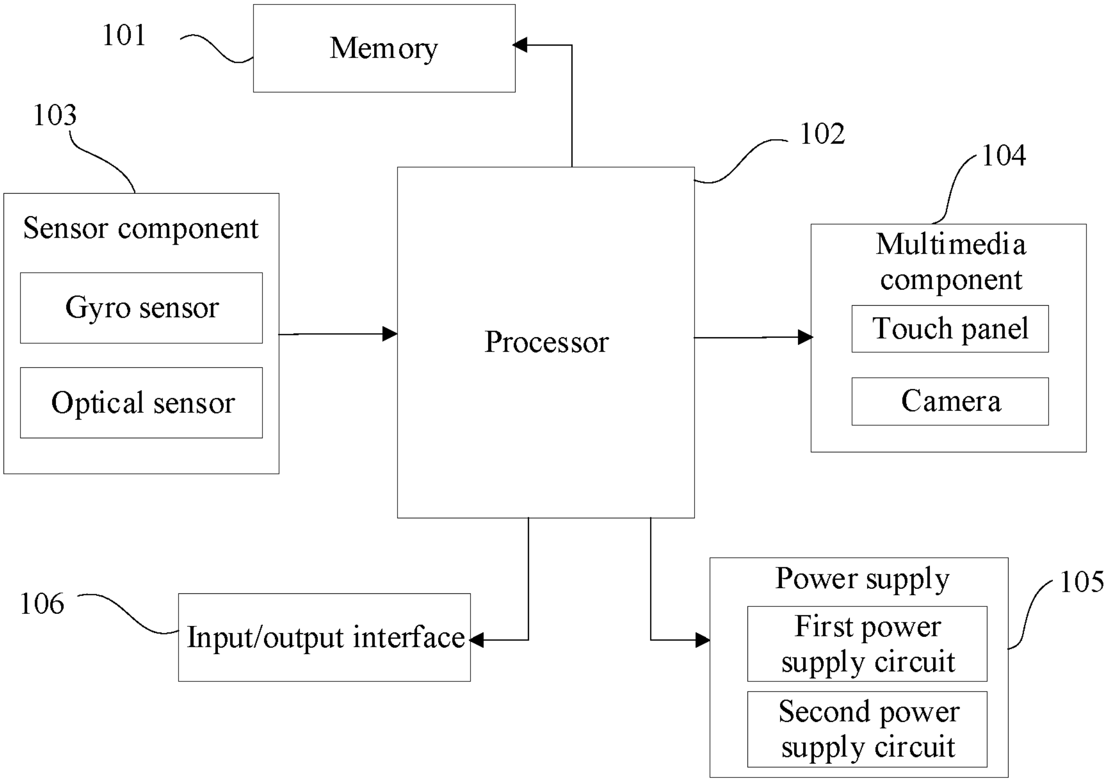
FIG. 3 is a schematic diagram of a structure of an electronic device according to an embodiment of this disclosure.

FIG. 3 is a schematic diagram of a structure of an electronic device according to an embodiment of this disclosure. An example in which the electronic device is a mobile phone is used for description. As shown in FIG. 3, the electronic device may include a memory 101, a processor 102, a sensor component 103, a multimedia component 104, a power supply 105, and an input/output interface 106.

The memory 101 may be configured to store data, a software program, and a software module, and mainly includes a program storage area and a data storage area. The program storage area may store an operating system and an disclosure program required by at least one function, such as a sound playing function or an image playing function. The data storage area may store data created based on use of the electronic device, such as audio data, image data, or a phone book. In addition, the electronic device may include a high-speed random access memory, or may include a non-volatile memory, for example, at least one magnetic disk storage device, a flash memory device, or another volatile solid-state storage device.

The processor 102 is a control center of the electronic device, is connected to all parts of the entire device by using various interfaces and lines, and performs various functions of the electronic device and data processing by running or executing a software program and/or a software module stored in the memory 101 and invoking data stored in the memory 101, to perform overall monitoring on the electronic device. Optionally, the processor 102 may include one or more processing units. For example, the processor 102 may include a central processing unit (CPU), an disclosure processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. In this embodiment of this disclosure, when a full integration solution is used, the processor 102 may be a system on chip (SoC). The SoC may include a storage circuit and a logic circuit configured to access the storage circuit. The storage circuit may be an on-chip random access memory (RAM) or cache.

The sensor component 103 includes one or more sensors, configured to provide status evaluation in various aspects for the electronic device. The sensor component 103 may include an acceleration sensor, a gyro sensor, a magnetic sensor, a pressure sensor, or a temperature sensor. The sensor component 103 may detect acceleration/deceleration, an orientation, an on/off state, relative positioning of a component, a temperature change of the electronic device, or the like of the electronic device. In addition, the sensor component 103 may further include an optical sensor, for example, a complementary metal-oxide-semiconductor (CMOS) or charge-coupled device (CCD) image sensor, configured to be used in an imaging disclosure, that is, to become a component of a camera.

The multimedia component 104 is a screen that provides an output interface between the electronic device and a user. The screen may be a touch panel. When the screen is a touch panel, the screen may be implemented as a touchscreen to receive an input signal from the user. The touch panel includes one or more touch sensors to sense touching, sliding, and a gesture on the touch panel. The touch sensor may not only sense a boundary of a touch action or a slide action, but also detect duration and a pressure related to the touch operation or the slide operation. In addition, the multimedia component 104 further includes at least one camera. For example, the multimedia component 104 includes a front-facing camera and/or a rear-facing camera. When the electronic device is in an operation mode, for example, a shooting mode or a video mode, the front-facing camera and/or the rear-facing camera may receive external multimedia data. Each front camera or rear camera may be a fixed optical lens system that has a focal length and an optical zoom capability.

The power supply 105 is configured to supply power to each component of the electronic device. The power supply 105 may include a power management system, one or more power supplies, or other components related to power generation, management, and distribution of the electronic device. In this embodiment of this disclosure, the power supply 105 may be a power supply chip, and specifically includes a first power supply circuit and a second power supply circuit. The first power supply circuit and the second power supply circuit may be separately configured to provide different supply voltages for the processor 102.

The input/output interface 106 provides an interface between the processor 102 and a peripheral interface module. For example, the peripheral interface module may be a keyboard, a mouse, or a universal serial bus (USB) device.

Although not shown, the electronic device may further include an audio component, a communication component, and the like. For example, the audio component includes a microphone, and the communication component includes a Wireless Fidelity (Wi-Fi) module, a Bluetooth module, or the like. Details are not described herein in this embodiment of this disclosure. A person skilled in the art may understand that the structure of the electronic device shown in FIG. 3 does not constitute any limitation on the electronic device, and may include more or fewer components than those shown in the diagram, or some components may be combined, or a different component layout may be used.

Figure 1:
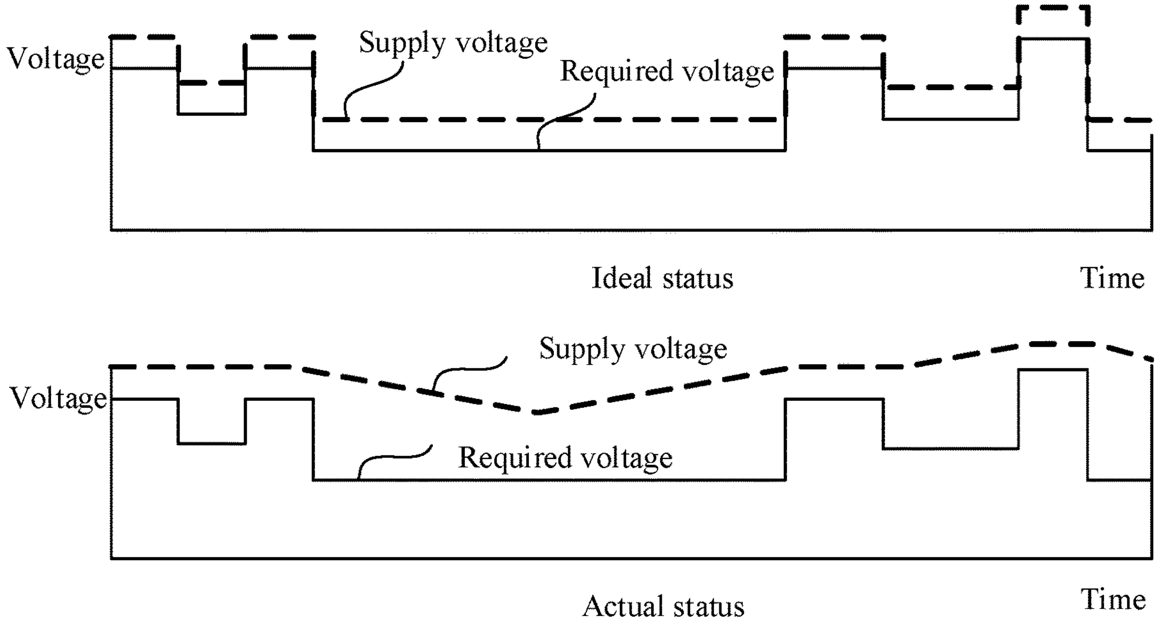
FIG. 1 is a schematic diagram of dynamic voltage scaling.
Figure 2:
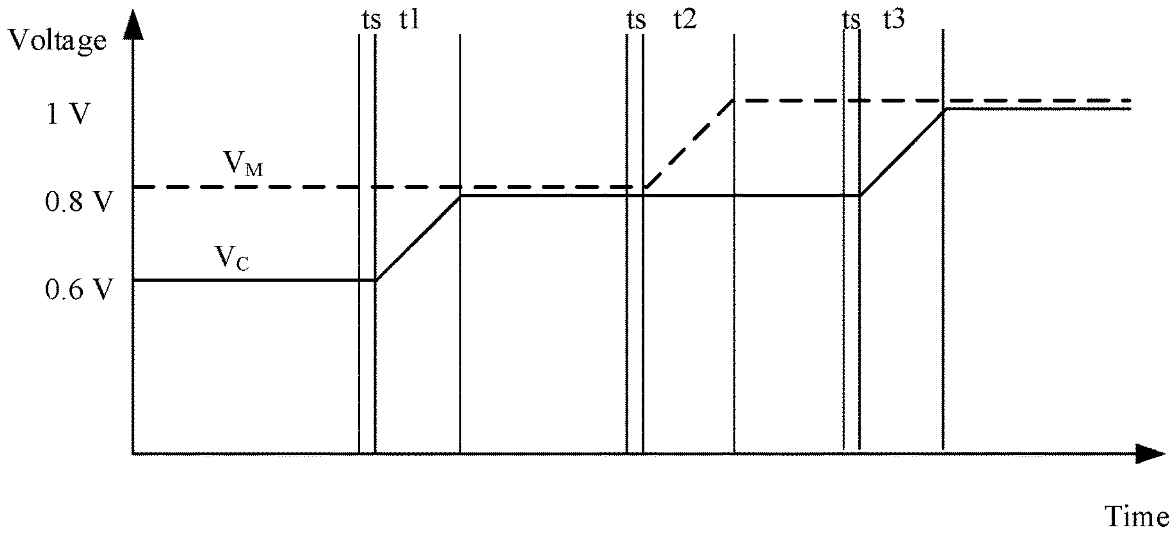
FIG. 2 is a schematic diagram of multi-step alternating voltage regulation.
Figure 4:
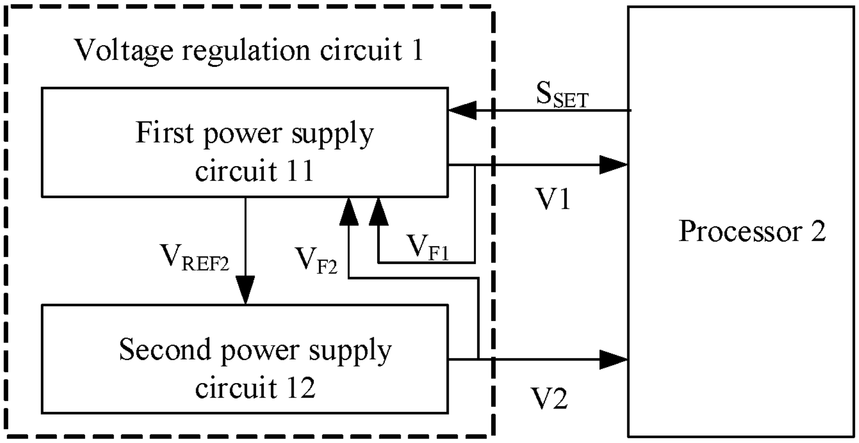
FIG. 4 is a schematic diagram of a structure of a voltage regulation circuit according to an embodiment of this disclosure.

FIG. 4 is a schematic diagram of a structure of a voltage regulation circuit 1 according to an embodiment of this disclosure. The voltage regulation circuit 1 may be coupled to a processor 2 to supply power to the processor 2, and may be specifically located in the power supply 105 in FIG. 1. Alternatively, the voltage regulation circuit 1 may be an independent component. As shown in FIG. 4, the voltage regulation circuit 1 may include a first power supply circuit 11 and a second power supply circuit 12. The first power supply circuit 11 is configured to: receive a voltage setting signal $S_{SET}$, and output a first supply voltage V1 and a second reference voltage $V_{REF2}$ according to the voltage setting signal $S_{SET}$ and a difference between a first feedback voltage $V_{F1}$ and a second feedback voltage $V_{F2}$, where the first feedback voltage $V_{F1}$ is used to indicate the first supply voltage V1, and the second feedback voltage $V_{F2}$ is used to indicate a second supply voltage V2. The second power supply circuit 12 is configured to convert the second reference voltage $V_{REF2}$ into the second supply voltage V2.

The processor 2 may be configured to output the voltage setting signal $S_{SET}$ according to a load status, so that the voltage regulation circuit 1 dynamically regulates the first supply voltage V1 and the second supply voltage V2 by using the voltage setting signal $S_{SET}$, where the voltage setting signal $S_{SET}$ may include a required voltage and a voltage regulation speed that correspond to the first supply voltage V1. For example, when a load is light, the processor 2 may output a small voltage setting signal $S_{SET}$, so that the voltage regulation circuit 1 reduces the first supply voltage V1 and the second supply voltage V2; or when the load is large, the processor 2 may output a large voltage setting signal $S_{SET}$, so that the voltage regulation circuit 1 increases the first supply voltage V1 and the second supply voltage V2. Optionally, the processor 2 may include a storage circuit 21 and a logic circuit 22 configured to access the storage circuit 21. The first supply voltage V1 output by the first power supply circuit 11 may be used to supply power to the logic circuit 22, and the second supply voltage V2 output by the second power supply circuit 12 may be used to supply power to the storage circuit 21.

In addition, there may be a voltage difference constraint between the first supply voltage V1 and the second supply voltage V2. For example, the voltage difference constraint may be that a difference obtained by subtracting V2 from V1 falls within a preset difference range (for example, [−200 mV, 400 mV]). In a process of regulating the first supply voltage V1 and the second supply voltage V2, the voltage regulation circuit 1 needs to ensure that a difference between the first supply voltage V1 and the second supply voltage V2 falls within the preset difference range.

Optionally, there may be an association relationship between the difference between the first feedback voltage $V_{F1}$ and the second feedback voltage $V_{F2}$ and the difference between the first supply voltage V1 and the second supply voltage V2, for example, a positive correlation relationship or a linear relationship. The difference between the first feedback voltage $V_{F1}$ and the second feedback voltage $V_{F2}$ falling within a preset range can ensure that the difference between the first supply voltage V1 and the second supply voltage V2 falls within a specific preset range. A positive correlation relationship between two parameters means that one parameter increases while the other parameter increases, or one parameter decreases while the other parameter decreases. In other words, the two parameters have a same change trend. A linear relationship between two parameters means that the two parameters are in a linear function relationship. For example, a ratio of the two parameters is a constant.

The following provides description by using an example in which the first feedback voltage $V_{F1}$ is equal to the first supply voltage V1, and the second feedback voltage $V_{F2}$ is equal to the second supply voltage V2. When the first feedback voltage $V_{F1}$ is equal to the first supply voltage V1 and the second feedback voltage $V_{F2}$ is equal to the second supply voltage V2, it is ensured that a difference between the first supply voltage V1 and the second supply voltage V2 falls within a preset difference range, that is, it is ensured that a difference between the first feedback voltage $V_{F1}$ and the second feedback voltage $V_{F2}$ falls within a preset difference range, for example, a voltage difference constraint range. It should be noted that the relationship between the first feedback voltage $VF_1$ and the first supply voltage V1 and the relationship between the second feedback voltage $V_{F2}$ and the second supply voltage V2 are merely examples. In actual disclosure, the relationship between the feedback voltage and the supply voltage may be another relationship. For example, the first feedback voltage $V_{F1}$ is equal to the first supply voltage V1 minus or plus a fixed value, and the second feedback voltage $V_{F2}$ is equal to the second supply voltage V2 minus or plus a fixed value. This is not specifically limited in this embodiment of this disclosure.

Specifically, in a process in which the voltage regulation circuit 1 regulates the first supply voltage V1 and the second supply voltage V2, the first power supply circuit 11 may output the first supply voltage V1 and the second reference voltage $V_{REF2}$ according to a voltage setting signal $S_{SET}$ and the difference between the first feedback voltage $V_{F1}$ and the second feedback voltage $V_{F2}$. The second power supply circuit 12 is configured to convert the second reference voltage $V_{REF2}$ into the second supply voltage V2. That is, in the foregoing voltage regulation process, regulation of the first supply voltage V1 is constrained by the difference between the first feedback voltage $V_{F1}$ and the second feedback voltage $V_{F2}$. Because there is an association relationship between the difference between the first feedback voltage $V_{F1}$ and the second feedback voltage $V_{F2}$ and the difference between the first supply voltage V1 and the second supply voltage V2, and the second reference voltage $V_{REF2}$ used to output the second supply voltage V2 is generated by the first power supply circuit 11, the second supply voltage V2 may change with regulation of the first supply voltage V1, and a regulation speed of the first supply voltage V1 is constrained by using the difference between the first feedback voltage $V_{F1}$ and the second feedback voltage $V_{F2}$, to ensure that the difference between the first supply voltage V1 and the second supply voltage V2 falls within a voltage difference constraint range, thereby ensuring continuity of voltage regulation, reducing a voltage regulation time, and improving performance of the processor and user experience.

Figure 5:
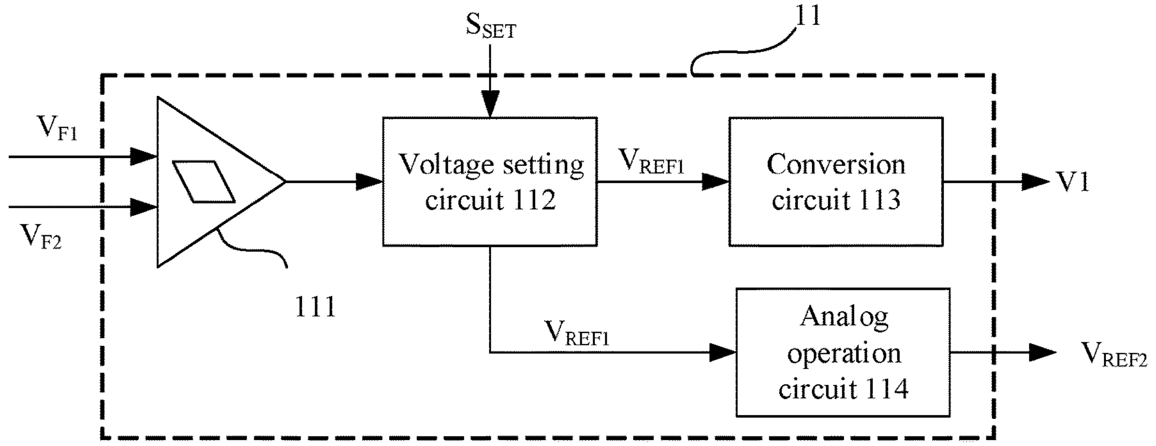
FIG. 5 is a schematic diagram of a structure of a first power supply circuit according to an embodiment of this disclosure.

In a possible embodiment, as shown in FIG. 5, the first power supply circuit 11 may include a hysteresis comparator 111, a voltage setting circuit 112, a conversion circuit 113, and an analog operation circuit 114. Two input terminals of the hysteresis comparator 111 may be configured to receive a first feedback voltage $V_{F1}$ and a second feedback voltage $V_{F2}$, respectively, and an output terminal of the hysteresis comparator 111 is coupled to a first input terminal of the voltage setting circuit 112. A second input terminal of the voltage setting circuit 112 may be configured to receive a voltage setting signal $S_{SET}$, a first output terminal of the voltage setting circuit 112 is coupled to an input terminal of the conversion circuit 113, and a second output terminal of the voltage setting circuit 112 is coupled to an input terminal of the analog operation circuit 114. An output terminal of the conversion circuit 113 is configured to output a first supply voltage V1. An output terminal of the analog operation circuit 114 is configured to output a second reference voltage $V_{REF2}$.

Specifically, the hysteresis comparator 111 may be configured to output a first control signal $S_{1C}$ according to a difference between the first feedback voltage $V_{F1}$ and the second feedback voltage $V_{F2}$, where the first control signal $S_{1C}$ includes a first signal $S_1$ or a second signal $S_2$. For example, the first signal $S_1$ is a high level, and the second signal $S_2$ is a low level. Optionally, the hysteresis comparator 111 is configured to output the first signal $S_1$ when the difference between the first feedback voltage $V_{F1}$ and the second feedback voltage $V_{F2}$ falls within a preset difference range; or the hysteresis comparator 111 is configured to output the second signal $S_2$ when the difference between the first feedback voltage $V_{F1}$ and the second feedback voltage $V_{F2}$ exceeds the preset difference range. The voltage setting circuit 112 may be configured to: set the first reference signal $V_{REF1}$ according to the voltage setting signal $S_{SET}$ when the first control signal $S_1c$ is the first signal $S_1$, or latch the first reference signal $V_{REF1}$ when the first control signal $S_{1C}$ changes from the first signal $S_1$ to the second signal $S_2$, that is, keep the current first reference signal $V_{REF1}$ unchanged when the first control signal $S_{1C}$ is the second signal $S_2$. The conversion circuit 113 is configured to convert the first reference signal $V_{REF1}$ into the first supply voltage V1. The analog operation circuit 114 may be configured to output the second reference voltage $V_{REF2}$ based on the first reference voltage $V_{REF1}$, that is, the second reference voltage $V_{REF2}$ may change with a change of the first reference voltage $V_{REF1}$.

It should be noted that the preset difference range may be a voltage difference constraint range corresponding to the difference between the first supply voltage V1 and the second supply voltage V2 or a range within the voltage difference constraint range. The preset difference range may be set in advance. For example, the preset difference range may be [−200 mV, 400 mV]. This is not specifically limited in this embodiment of this disclosure.

Figure 6:
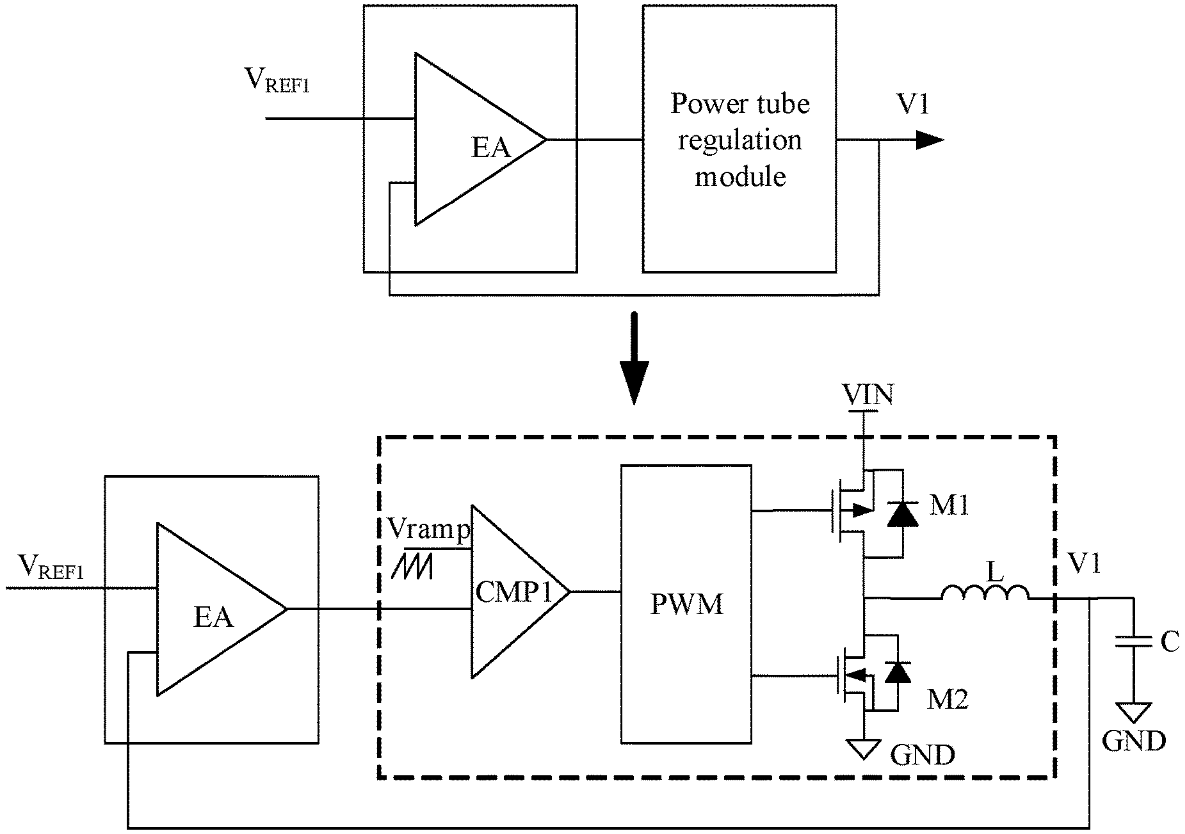
FIG. 6 is a schematic diagram of a structure of a conversion circuit according to an embodiment of this disclosure.

Optionally, the foregoing conversion circuit 113 may include a direct current-direct current (DC-DC) conversion circuit. A typical implementation solution of the DC-DC conversion circuit is a buck circuit, a boost circuit, or a buck-boost circuit, which is not limited in this embodiment. For example, a buck circuit is used as an example. As shown in FIG. 6, the conversion circuit 113 may include a bias feedback module and a power tube regulation module, and the bias feedback module may include an error amplifier EA. Specifically, the first supply voltage V1 and the first reference voltage $V_{REF1}$ output an error signal by using the error amplifier EA. The error signal is transmitted to the power tube regulation module. The power tube regulation module regulates the first supply voltage V1 by changing a switch duty cycle, an on-resistance, or the like. Finally, an output of the error amplifier EA is 0, that is, the first supply voltage V1 reaches the first reference voltage $V_{REF1}$. The foregoing entire loop forms a negative feedback mechanism, and the first supply voltage V1 at a steady-state operating point depends on a setting of the first reference voltage $V_{REF1}$. If the first supply voltage V1 needs to be changed, only the first reference voltage $V_{REF1}$ needs to be changed.

For example, as shown in FIG. 6, the power tube regulation module may include a comparator CMP1, a pulse width modulator (PWM), a first transistor M1, a second transistor M2, and an inductor L, where VIN represents a voltage input terminal, GND represents a ground terminal, and C represents a load capacitor. Specifically, the error amplifier EA outputs an error signal by comparing and amplifying the first reference voltage $V_{REF1}$ and the first supply voltage V1. The comparator CMP1 compares the error signal with a fixed triangular wave frequency signal Vramp, and outputs a PWM signal that has a same frequency as the Vramp and a variable duty cycle. The PWM signal passes through a pulse width modulator PWM module, and the PWM module controls the first transistor M1 and the second transistor M2 to alternately turn on, to change a switch duty cycle, an on-resistance, and the like.

Figure 7:
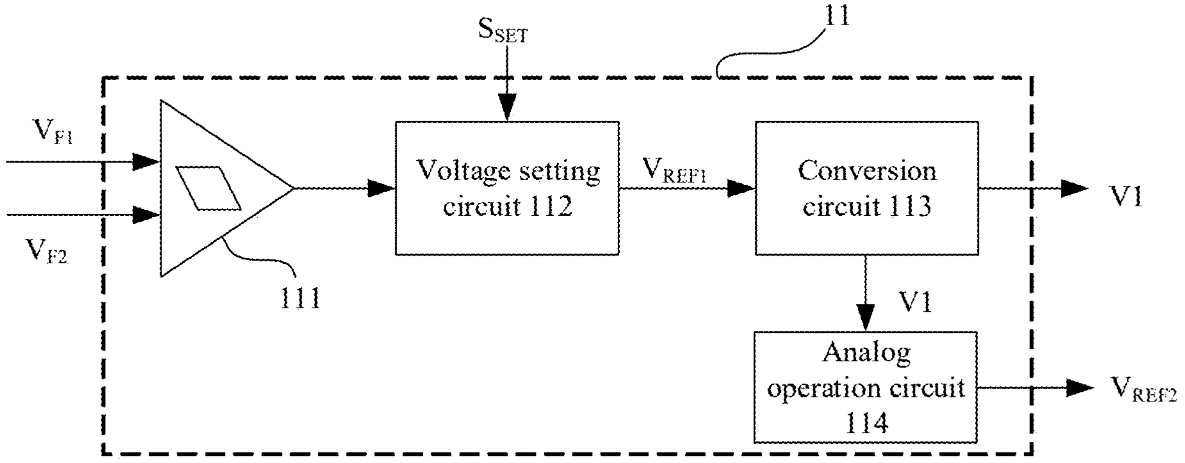
FIG. 7 is a schematic diagram of a structure of another first power supply circuit according to an embodiment of this disclosure.

In another possible embodiment, as shown in FIG. 7, a connection relationship between an input terminal of the analog operation circuit 114 in the first power supply circuit 11 shown in FIG. 5 may be replaced with: coupling to an output terminal of the conversion circuit 113, that is, the input terminal of the analog operation circuit 114 may be configured to receive the first supply voltage V1 output by the conversion circuit 113. In this case, the analog operation circuit 114 may be configured to output the second reference voltage $V_{REF2}$ based on the first supply voltage V1, that is, the second reference voltage $V_{REF2}$ may change with a change of the first supply voltage V1.

In the foregoing two possible implementations, the first reference voltage $V_{REF1}$ or the first feedback voltage $V_{F1}$ and the second reference voltage $V_{REF2}$ may be in a positive correlation relationship in a voltage regulation phase, that is, the second reference voltage $V_{REF2}$ increases as the first reference voltage $V_{REF1}$ or the first feedback voltage $V_{F1}$ increases, and decreases as the first reference voltage $V_{REF1}$ or the first feedback voltage $V_{F1}$ decreases. Optionally, the first reference voltage $V_{REF1}$ and the second reference voltage $V_{REF2}$ may be in a linear relationship; or the first supply voltage V1 and the second reference voltage $V_{REF2}$ may be in a linear relationship. The following provides description by using an example in which the first reference voltage $V_{REF1}$ and the second reference voltage $V_{REF2}$ are in a linear relationship.

Specifically, the first reference voltage $V_{REF1}$ and the second reference voltage $V_{REF2}$ meet the following formula (I), where k and b in the formula may be real numbers. For example, k may be less than 0, and b may be greater than 0, so that the first reference voltage $V_{REF1}$ may be greater than the second reference voltage $V_{REF2}$, and the first supply voltage V1 may be greater than the second supply voltage V2.

$$V_{REF2}-k\times V_{REF1}+1) \quad \text{(I)}$$

Figure 8:
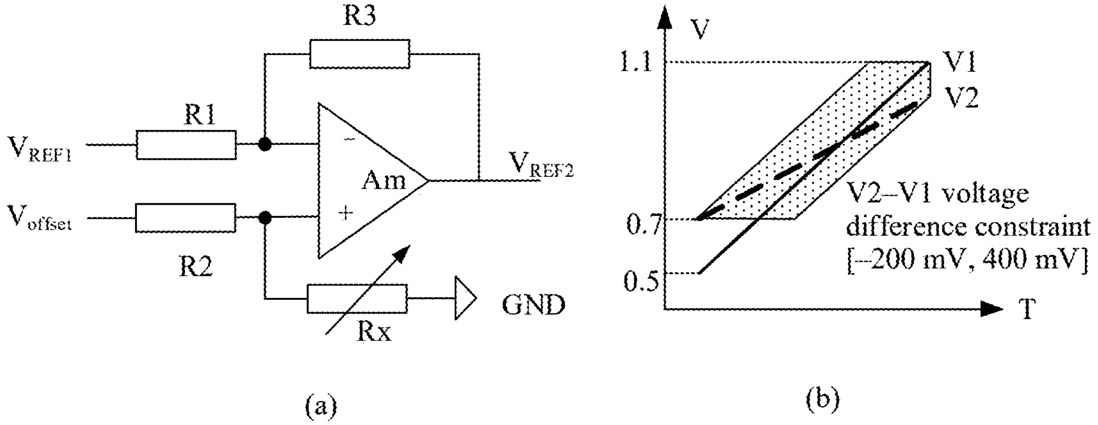
FIG. 8 is a schematic diagram of a structure of an analog operation circuit according to an embodiment of this disclosure.

Further, as shown in (a) in FIG. 8, the analog operation circuit 114 may include: an operational amplifier Am, a first resistor R1, a second resistor R2, a third resistor R3, and a variable resistor Rx. An end of the first resistor R1 is coupled to a negative input terminal of the operational amplifier Am, an end of the second resistor R2 is coupled to a positive input terminal of the operational amplifier Am, the third resistor R3 is coupled between the negative input terminal of the operational amplifier Am and an output terminal of the operational amplifier Am, and the variable resistor Rx is coupled between the positive input terminal of the operational amplifier Am and a ground terminal GND. The other end of the first resistor R1 is configured to receive a first reference voltage $V_{REF1}$ or a first feedback voltage $V_{F1}$, the other end of the second resistor R2 is configured to receive an offset voltage $V_{offset}$, and the output terminal of the operational amplifier Am is configured to output a second reference voltage $V_{REF2}$. In this case, the first reference voltage $V_{REF1}$ or the first feedback voltage $V_{F1}$ may be in a linear relationship with the second reference voltage $V_{REF2}$. For example, an initial value of the first supply voltage V1 is 0.5 V, a required voltage is 1.1 V, and a constraint of the first supply voltage V1 and the second supply voltage V2 is that V1-V2 falls within [−200 mV, 400 mV]. In this case, in a voltage regulation process, a relationship between the first supply voltage V1 and the second supply voltage V2 may be shown in (b) in FIG. 8, where T represents time. In a process in which the first supply voltage V1 increases from 0.5 V to 1.1 V, the second supply voltage V2 may increase from 0.7 V to 0.9 V.

Specifically, when the other end of the first resistor R1 in the analog operation circuit 114 is configured to receive the first reference voltage $V_{REF1}$, the second reference voltage $V_{REF2}$ may be determined by using the following formula (II). When the first reference voltage $V_{REF1}$ and the second reference voltage $V_{REF2}$ are in the linear relationship shown in the formula (I), specific values of k and b may be represented by the following formula (III): In an actual disclosure, different values of k and b may be obtained by setting different resistance values.

$$V_{REF2} = -\frac{R3}{R1}\times V_{REF1} + \left(1+\frac{R3}{R1}\right)\times V_{offset}\times\frac{Rx}{R2+Rx} \quad \text{(II)}$$

$$\begin{cases} k = -\dfrac{R3}{R1} \\ b = \left(1+\dfrac{R3}{R1}\right)\times V_{offset}\times\dfrac{Rx}{R2+Rx} \end{cases} \quad \text{(III)}$$

It should be noted that, when the other end of the first resistor R1 in the analog operation circuit 114 is configured to receive the first feedback voltage $V_{F1}$, the second reference voltage $V_{REF2}$ and specific values of k and b may also be determined by using formulas similar to the foregoing formulas, and a difference lies only in that $V_{REF1}$ in the foregoing formulas (II) and (III) is replaced with $V_{F1}$.

Figure 9:
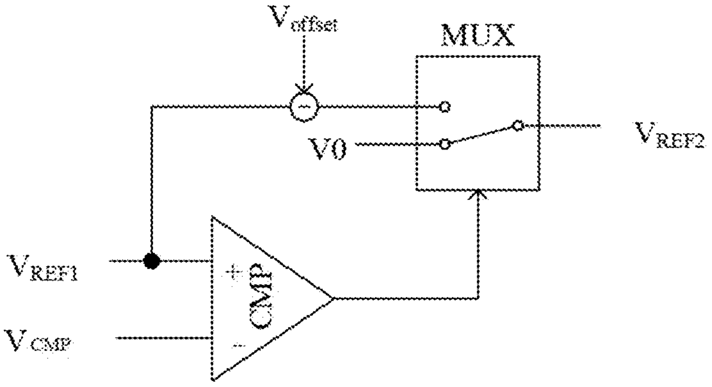
FIG. 9 is a schematic diagram of a structure of another analog operation circuit according to an embodiment of this disclosure.

Alternatively, as shown in FIG. 9, the analog operation circuit 114 may include a comparator CMP and a multiplexer MUX. The multiplexer MUX may also be referred to as a multiplex analog selector or a multiplex analog switch. This is not specifically limited in this embodiment of this disclosure. When the input terminal of the analog operation circuit 114 is coupled to the second output terminal of the voltage setting circuit, the comparator CMP may be configured to compare a preset voltage $V_{CMP}$ with the first reference voltage $V_{REF1}$ to output a second control signal $S_{2C}$, where the second control signal $S_{2C}$ includes a third signal $S_3$ or a fourth signal $S_4$. For example, the third signal $S_3$ is a high level, and the fourth signal $S_4$ is a low level. For example, the comparator CMP is configured to compare the preset voltage $V_{CMP}$ with the first reference voltage $V_{REF1}$. When the preset voltage $V_{CMP}$ is less than or equal to the first reference voltage $V_{REF1}$, the comparator CMP may be configured to output a high level (that is, the third signal $S_3$); or when the preset voltage $V_{CMP}$ is greater than the first reference voltage $V_{REF1}$, the comparator CMP may be configured to output a low level (that is, the fourth signal $S_4$).

In addition, the multiplexer MUX may be configured to: select the difference between the first reference voltage $V_{REF1}$ and an offset voltage $V_{offset}$ as the second reference voltage $V_{REF2}$ when the second control signal $S_{2C}$ is the third signal $S_3$, or select a fixed voltage V0 as the second reference voltage $V_{REF2}$ when the second control signal $S_{2C}$ is the fourth signal $S_4$. Herein, the difference between the first reference voltage $V_{REF1}$ and the offset voltage $V_{offset}$ may be selected by using a subtractor. The subtractor may be integrated in the multiplexer MUX, or may be independently disposed outside the multiplexer MUX as shown in FIG. 9. The offset voltage $V_{offset}$ in FIG. 9 and the offset voltage $V_{offset}$ in FIG. 8 are different offset voltages. In this case, in a phase in which the preset voltage $V_{CMP}$ is less than or equal to the first reference voltage $V_{REF1}$, the first reference voltage $V_{REF1}$ and the second reference voltage $V_{REF2}$ are in a linear relationship.

Specifically, when the preset voltage $V_{CMP}$ is less than or equal to the first reference voltage $V_{REF1}$, the comparator CMP may output a high level, so that the multiplexer MUX may select $V_{REF1}$-$V_{offset}$ as the second reference voltage $V_{REF2}$ according to the high level; or when the preset voltage $V_{CMP}$ is greater than the first reference voltage $V_{REF1}$, the comparator CMP may output a low level, so that the multiplexer MUX may select a fixed voltage V0 as the second reference voltage $V_{REF2}$ according to the low level. Subsequently, the second supply voltage V2 output by the second power supply circuit 12 by using the second reference voltage $V_{REF}$ may always be a minimum value within a required range, so that power consumption can be minimized. In addition, when the second control signal $S_{2C}$ is the fourth signal $S_4$ (that is, the first supply voltage V1 is small), the second reference voltage $V_{REF2}$ is controlled to be a fixed voltage V0, and it can be further ensured that the second supply voltage V2 meets a minimum power supply requirement.

Figure 10:
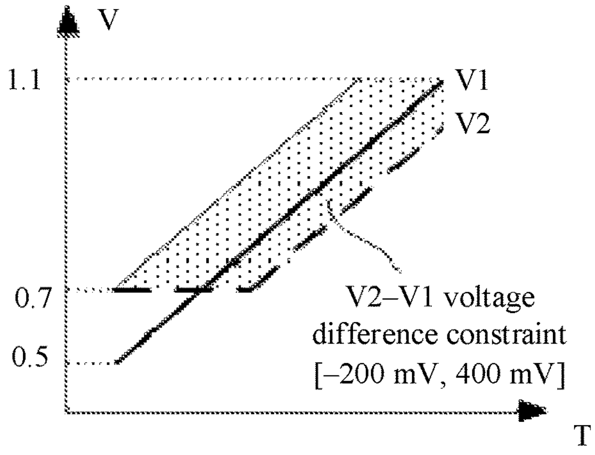
FIG. 10 is a schematic diagram of V1 and V2 in a voltage regulation process according to an embodiment of this disclosure.

For example, it is assumed that V0=0.7 V, an initial value of the first supply voltage V1 is 0.5 V, a required voltage is 1.1 V, and a constraint of the first supply voltage V1 and the second supply voltage V2 is that V1-V2 falls within [−200 mV, 400 mV]. In this case, in a voltage regulation process, a relationship between the first supply voltage V1 and the second supply voltage V2 may be shown in FIG. 10, where T represents time. In a process in which the first supply voltage V1 increases from 0.5 V to 1.1 V, a voltage regulation process of the second supply voltage V2 may be divided into two phases. In the first phase, the second supply voltage V2 is equal to 0.7 V; and in the second phase, the second supply voltage V2 gradually increases and is always at a minimum value (for example, 0.9 V) within a voltage difference constraint range.

It should be noted that a connection relationship of an input terminal of the analog operation circuit 114 may alternatively be replaced with: coupling to an output terminal of the conversion circuit 113. Correspondingly, the comparator CMP and the multiplexer MUX in the analog operation circuit 114 may implement functions similar to the foregoing functions based on the first supply voltage V1 output by the conversion circuit 113. Details are not described herein again in this embodiment of this disclosure.

In addition, a specific structure of the analog operation circuit 114 may be replaced with another circuit having similar functions. FIG. 8 and FIG. 9 are merely examples, and do not constitute a limitation on this embodiment of this disclosure.

Figure 11:
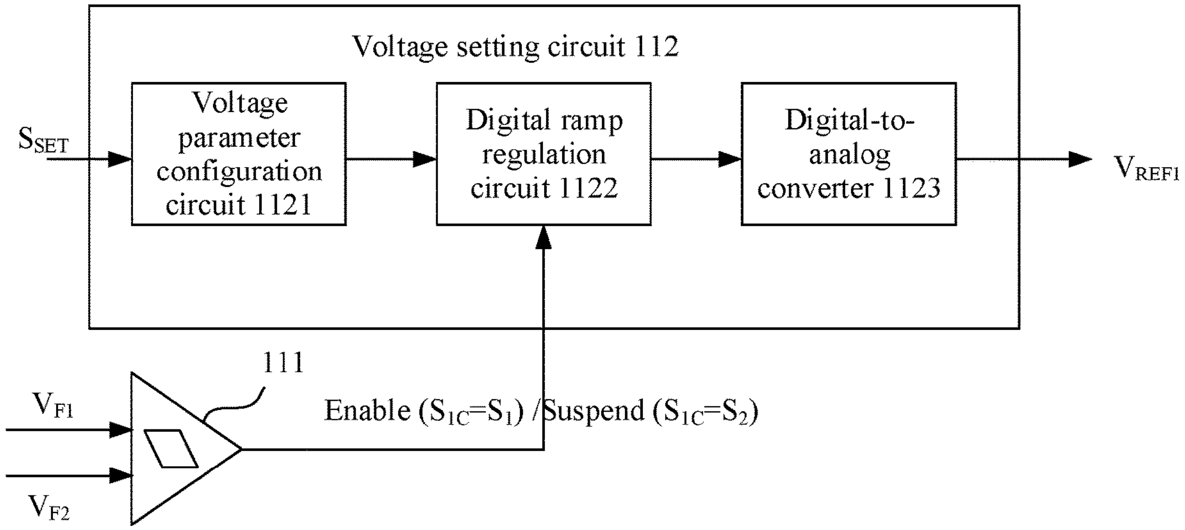
FIG. 11 is a schematic diagram of a voltage setting circuit according to an embodiment of this disclosure.

Further, as shown in FIG. 11, the voltage setting circuit 112 may include: a voltage parameter configuration circuit 1121, a digital ramp modulation circuit 1122, and a digital-to-analog converter (DAC) 1123. The voltage parameter configuration circuit 1121 and the digital ramp modulation circuit 1122 herein may be collectively referred to as a digital voltage generation circuit.

The voltage parameter configuration circuit 1121 is configured to store a voltage setting signal $S_{SET}$, for example, configured to store a value of a required voltage and a voltage regulation speed. The digital ramp regulation circuit 1122 is configured to generate a digital voltage according to the value of the required voltage, the voltage regulation speed, and a clock signal $S_{CLK}$ when a first control signal $S_{1C}$ is a first signal $S_1$, that is, the first signal $S_1$ may be used to enable the digital ramp regulation circuit 1122 to operate normally. For example, the digital ramp regulation circuit 1122 is configured to provide voltage codewords (that is, digital voltages) corresponding to different voltages in ascending or descending order of the voltage regulation speed. For example, if an initial value of the first supply voltage V1 is 1 V, the required voltage is 5 V, and the voltage regulation speed is 0.5 V/s (second), the digital ramp regulation circuit 1122 may be configured to sequentially provide voltage codewords corresponding to 1.5 V, 2 V, 2.5 V, . . . , and 5 V in ascending order. Alternatively, the digital ramp regulation circuit 1122 is configured to latch a previous digital voltage when the first control signal $S_{1C}$ changes from the first signal $S_1$ to a second signal $S_2$, that is, the second signal $S_2$ may be used to keep the digital voltage output by the digital ramp regulation circuit 1122 unchanged. The digital-to-analog converter 1123 is configured to convert the digital voltage into an analog voltage, where the analog voltage is the first reference voltage $V_{REF1}$.

Further, a second power supply circuit 12 in the circuit regulation circuit 1 may include a conversion circuit. A specific structure of the conversion circuit may be similar to the structure of the conversion circuit 113 in the first power supply circuit 11, and the conversion circuit is specifically configured to convert the second reference voltage $V_{REF2}$ into the second supply voltage V2. Details are not described herein again in this embodiment of this disclosure.

In this embodiment of this disclosure, in a process in which the voltage regulation circuit 1 regulates the first supply voltage V1 and the second supply voltage V2, if a difference between the first supply voltage V1 and the second supply voltage V2 exceeds or is about to exceed a voltage difference constraint range, a previous digital voltage may be latched by using the digital ramp regulation circuit 1122 in the voltage setting circuit 112, that is, regulation of the first supply voltage V1 is suspended, and the first supply voltage V1 continues to be regulated after the second supply voltage V2 is properly regulated, to regulate the first supply voltage V1 and the second supply voltage V2 in a linked manner, and ensure that the difference between the first supply voltage V1 and the second supply voltage V2 falls within the voltage difference constraint range, thereby ensuring continuity of voltage regulation, reducing a voltage regulation time, and improving performance of the processor and user experience.

Figure 12:
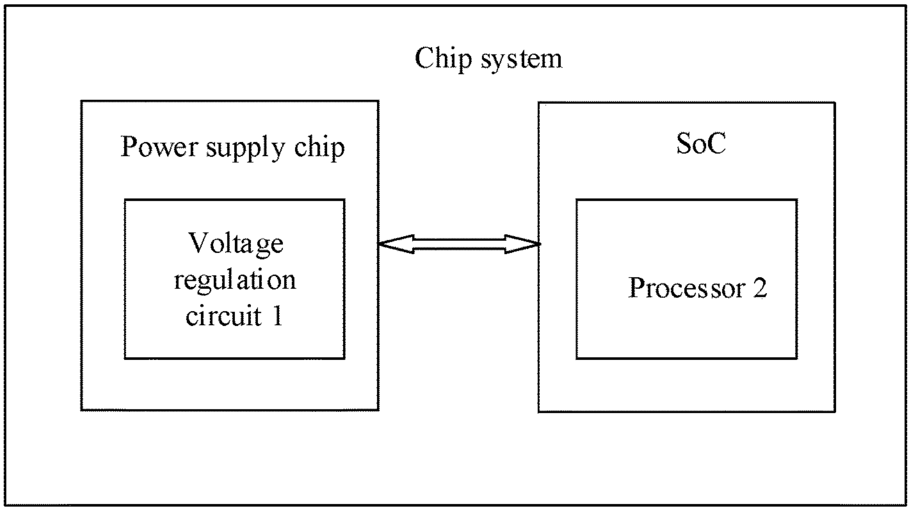
FIG. 12 is a schematic diagram of a chip system according to an embodiment of this disclosure.

Based on this, as shown in FIG. 12, an embodiment of this disclosure further provides a chip system. The chip system includes a system on chip (SoC) and a power supply chip that supplies power to the SoC. The power supply chip may include any voltage regulation circuit 1 provided above, and the SoC may include the processor 2 provided above.

An embodiment of this disclosure further provides an electronic device. The device includes a circuit board. The circuit board includes an SoC and a power supply chip that supplies power to the SoC. The power supply chip may include any voltage regulation circuit 1 provided above, and the SoC may include the processor 2 provided above.

It should be noted that related descriptions of the voltage regulation circuit 1 and the processor 2 provided above may be applied to the chip system or the electronic device. Details are not described herein again in this embodiment of this disclosure.

Figure 13:
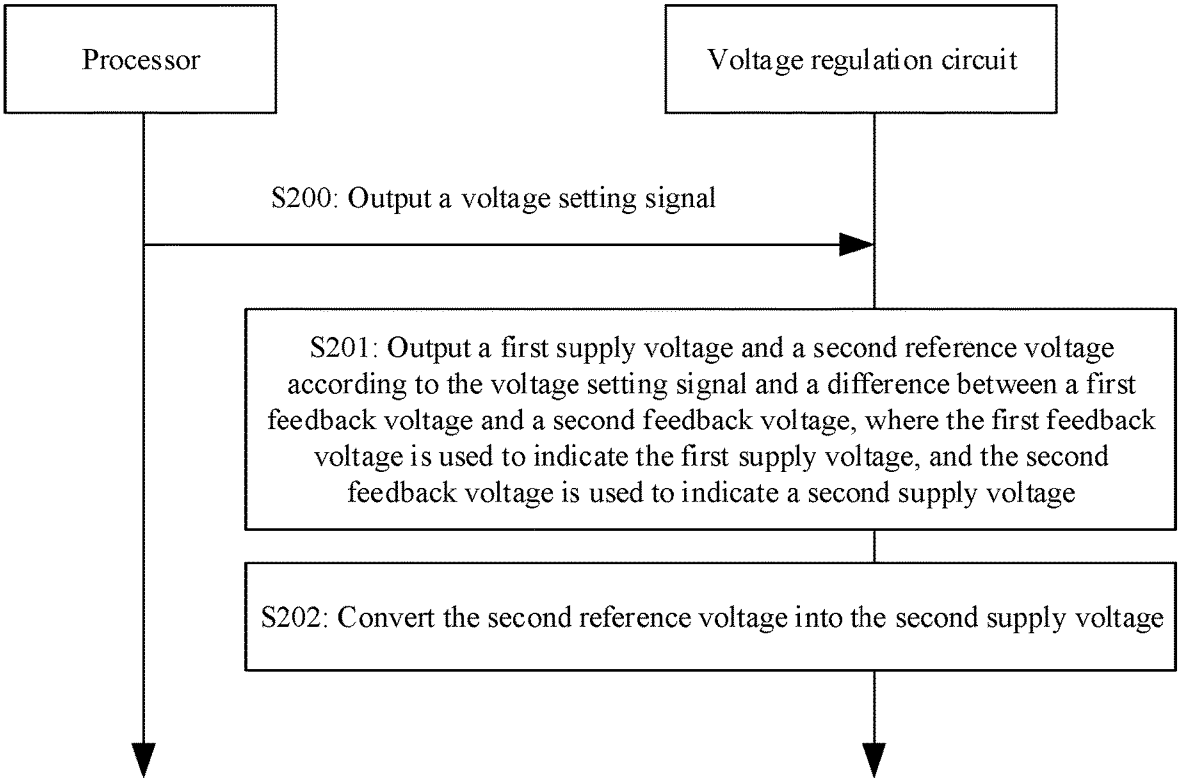
FIG. 13 is a schematic flowchart of a voltage regulation method according to an embodiment of this disclosure.

FIG. 13 is a schematic flowchart of a voltage regulation method according to an embodiment of this disclosure. The method may be applied to the voltage regulation circuit provided above. The voltage regulation circuit is coupled to a processor. The method may include the following steps.

S200: A processor outputs a voltage setting signal, where the voltage setting signal includes a required voltage and a voltage regulation speed. The processor may be a system on chip (SoC). The processor may output the voltage setting signal according to a load status, where the voltage setting signal may include a required voltage and a voltage regulation speed. For example, when the load is light, the processor may output a small voltage setting signal, so that the voltage regulation circuit reduces a supply voltage; or when the load is large, the processor may output a large voltage setting signal, so that the voltage regulation circuit increases the supply voltage.

S201: Output a first supply voltage and a second reference voltage according to the voltage setting signal and a difference between a first feedback voltage and a second feedback voltage, where the first feedback voltage is used to indicate the first supply voltage, and the second feedback voltage is used to indicate a second supply voltage. There may be a voltage difference constraint between the first supply voltage and the second supply voltage. In a process of regulating the first supply voltage and the second supply voltage, the voltage regulation circuit needs to ensure that the difference between the first supply voltage and the second supply voltage falls within a preset difference range. There is an association relationship between the difference between the first feedback voltage and the second feedback voltage and the difference between the first supply voltage and the second supply voltage, for example, the difference between the first feedback voltage and the second feedback voltage falling within a preset range can ensure that the difference between the first supply voltage and the second supply voltage falls within a specific preset range, for example, a voltage difference constraint range. Optionally, the first feedback voltage is equal to the first supply voltage, and the second feedback voltage is equal to the second supply voltage. Therefore, the difference between the first feedback voltage and the second feedback voltage is the difference between the first supply voltage and the second supply voltage.

Specially, the outputting a first supply voltage and a second reference voltage according to the voltage setting signal and a difference between a first feedback voltage and a second feedback voltage includes: outputting a first control signal based on the difference between the first feedback voltage and the second feedback voltage, where the first control signal includes a first signal or a second signal, the first signal is used to indicate that the difference between the first feedback voltage and the second feedback voltage falls within a preset difference range, and the second signal is used to indicate that the difference between the first feedback voltage and the second feedback voltage exceeds the preset difference range; setting the first reference signal according to the voltage setting signal when the first control signal is the first signal, or latching the first reference signal when the first control signal changes from the first signal to the second signal; converting a first reference voltage into the first supply voltage; and outputting the second reference voltage based on the first reference voltage or the first feedback voltage.

In another possible implementation, the setting the first reference signal according to the voltage setting signal when the first control signal is the first signal includes: generating a digital voltage according to the voltage setting signal when the first control signal is the first signal, or latching a digital voltage when the first control signal changes from the first signal to the second signal; and converting the digital voltage into an analog voltage, to obtain the first reference voltage.

In still another possible implementation, the outputting the second reference voltage based on the first reference voltage or the first feedback voltage includes: comparing the first reference voltage with a preset voltage to output a second control signal, where the second control signal includes a third signal or a fourth signal; and selecting a difference between the first reference voltage and the offset voltage as the second reference voltage when the second control signal is the third signal, or selecting a fixed voltage as the second reference voltage when the second control signal is the fourth signal.

S202: Convert the second reference voltage into the second supply voltage. The processor may include a storage circuit and a logic circuit configured to access the storage circuit. The first supply voltage may be used to supply power to the logic circuit, and the second supply voltage may be used to supply power to the storage circuit.

It should be noted that all modules of the voltage regulation circuit provided above may be configured to perform corresponding steps in the voltage regulation methods provided in embodiments of this disclosure. Because the modules and specific processes are described in detail in the foregoing embodiments of the voltage regulation circuit, details are not described herein again.

In the voltage regulation process, regulation of the first supply voltage is constrained by the difference between the first feedback voltage and the second feedback voltage, and the second reference voltage used to output the second supply voltage is generated by the first power supply circuit, so that the second supply voltage may change with regulation of the first supply voltage, and a regulation speed of the first supply voltage is constrained by the difference between the first feedback voltage and the second feedback voltage, to ensure that the difference between the first supply voltage and the second supply voltage falls within the voltage difference constraint range, thereby ensuring continuity of voltage regulation, reducing a voltage regulation time, and improving performance of the processor and user experience.

In conclusion, the foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A voltage regulation circuit, comprising:

a first power supply circuit, configured to: receive a voltage setting signal, and output a first supply voltage and a second reference voltage according to the voltage setting signal and a difference between a first feedback voltage and a second feedback voltage, the first feedback voltage indicating the first supply voltage, and the second feedback voltage indicating a second supply voltage; and a second power supply circuit, configured to convert the second reference voltage into the second supply voltage;

wherein the first power supply circuit comprises:

a hysteresis comparator, configured to compare the first feedback voltage with the second feedback voltage and output a first control signal in accordance with the difference between the first feedback voltage and the second feedback voltage, such that the first control signal is a first signal indicating that the difference falls within a preset difference range, or the first control signal is a second signal indicating that the difference exceeds the preset difference range;

a voltage setting circuit, configured to set a first reference signal according to the voltage setting signal when the first control signal is the first signal, and latch the first reference signal when the first control signal changes from the first signal to the second signal;

a conversion circuit, configured to convert the first reference voltage into the first supply voltage; and an analog operation circuit, configured to output the second reference voltage based on the first reference voltage or the first feedback voltage.

2. The voltage regulation circuit according to claim 1, wherein the voltage setting circuit comprises:

a digital voltage generation circuit, configured to generate a digital voltage according to the voltage setting signal when the first control signal is the first signal, or latch the digital voltage when the first control signal changes from the first signal to the second signal; and a digital-to-analog converter, configured to convert the digital voltage into an analog voltage, to obtain the first reference voltage.

3. The voltage regulation circuit according to claim 1, wherein the analog operation circuit comprises a comparator and a multiplexer;

the comparator is configured to compare the first reference voltage with a preset voltage, to output a second control signal, wherein the second control signal comprises a third signal or a fourth signal; and the multiplexer is configured to: select a difference between the first reference voltage and an offset voltage as the second reference voltage when the second control signal is the third signal, or select a fixed voltage as the second reference voltage when the second control signal is the fourth signal.

4. The voltage regulation circuit according to claim 1, wherein the analog operation circuit comprises an operational amplifier, a first resistor, a second resistor, a third resistor, and a variable resistor;

an end of the first resistor is coupled to a negative input terminal of the operational amplifier, an end of the second resistor is coupled to a positive input terminal of the operational amplifier, the third resistor is coupled between the negative input terminal of the operational amplifier and an output terminal of the operational amplifier, and the variable resistor is coupled between the positive input terminal of the operational amplifier and a ground terminal; and the other end of the first resistor is configured to receive the first reference voltage, the other end of the second resistor is configured to receive the offset voltage, and the output terminal of the operational amplifier is configured to output the second reference voltage.

5. A voltage regulation device, comprising: a voltage regulation circuit and a processor coupled to the voltage regulation circuit, wherein the processor is configured to generate a voltage setting signal; and the voltage regulation circuit comprises:

a first power supply circuit, configured to: receive the voltage setting signal, and output a first supply voltage and a second reference voltage according to the voltage setting signal and a difference between a first feedback voltage and a second feedback voltage, the first feedback voltage indicating the first supply voltage, and the second feedback voltage indicating a second supply voltage; and a second power supply circuit, configured to convert the second reference voltage into the second supply voltage;

wherein the first power supply circuit comprises:

a hysteresis comparator, configured to compare the first feedback voltage with the second feedback voltage and output a first control signal in accordance with the difference between the first feedback voltage and the second feedback voltage, such that the first control signal is a first signal indicating that the difference falls within a preset difference range, or the first control signal is a second signal indicating that the difference exceeds the preset difference range;

a voltage setting circuit, configured to set a first reference signal according to the voltage setting signal when the first control signal is the first signal, and latch the first reference signal when the first control signal changes from the first signal to the second signal:

a conversion circuit, configured to convert the first reference voltage into the first supply voltage; and an analog operation circuit, configured to output the second reference voltage based on the first reference voltage or the first feedback voltage.

6. The voltage regulation device according to claim 5, wherein the voltage setting circuit comprises:

a digital voltage generation circuit, configured to generate a digital voltage according to the voltage setting signal when the first control signal is the first signal, or latch the digital voltage when the first control signal changes from the first signal to the second signal; and a digital-to-analog converter, configured to convert the digital voltage into an analog voltage, to obtain the first reference voltage.

7. The voltage regulation device according to claim 5, wherein the analog operation circuit comprises a comparator and a multiplexer;

the comparator is configured to compare the first reference voltage with a preset voltage, to output a second control signal, wherein the second control signal comprises a third signal or a fourth signal; and the multiplexer is configured to: select a difference between the first reference voltage and an offset voltage as the second reference voltage when the second control signal is the third signal, or select a fixed voltage as the second reference voltage when the second control signal is the fourth signal.

8. The voltage regulation device according to claim 5, wherein the analog operation circuit comprises an operational amplifier, a first resistor, a second resistor, a third resistor, and a variable resistor;

an end of the first resistor is coupled to a negative input terminal of the operational amplifier, an end of the second resistor is coupled to a positive input terminal of the operational amplifier, the third resistor is coupled between the negative input terminal of the operational amplifier and an output terminal of the operational amplifier, and the variable resistor is coupled between the positive input terminal of the operational amplifier and a ground terminal; and the other end of the first resistor is configured to receive the first reference voltage, the other end of the second resistor is configured to receive the offset voltage, and the output terminal of the operational amplifier is configured to output the second reference voltage.

9. The voltage regulation device according to claim 5, wherein the processor comprises a storage circuit and a logic circuit, the first supply voltage is used to supply power to the logic circuit, and the second supply voltage is used to supply power to the storage circuit.

10. The voltage regulation device according to claim 5, wherein the processor is a system on chip (SoC).

11. A chip system, comprising a system on chip (SoC) and a power supply chip that supplies power to the SoC, wherein the power supply chip comprises a voltage regulation circuit that includes:

a first power supply circuit, configured to: receive a voltage setting signal, and output a first supply voltage and a second reference voltage according to the voltage setting signal and a difference between a first feedback voltage and a second feedback voltage, the first feedback voltage indicating the first supply voltage, and the second feedback voltage indicating a second supply voltage; and a second power supply circuit, configured to convert the second reference voltage into the second supply voltage;

wherein the first power supply circuit comprises:

a hysteresis comparator, configured to compare the first feedback voltage with the second feedback voltage and output a first control signal in accordance with the difference between the first feedback voltage and the second feedback voltage, such that the first control signal is a first signal indicating that the difference falls within a preset difference range, or the first control signal is a second signal indicating that the difference exceeds the preset difference range;

a voltage setting circuit, configured to set a first reference signal according to the voltage setting signal when the first control signal is the first signal, and latch the first reference signal when the first control signal changes from the first signal to the second signal;

a conversion circuit, configured to convert the first reference voltage into the first supply voltage; and an analog operation circuit, configured to output the second reference voltage based on the first reference voltage or the first feedback voltage.

12. The chip system according to claim 11, wherein the voltage setting circuit comprises:

a digital voltage generation circuit, configured to generate a digital voltage according to the voltage setting signal when the first control signal is the first signal, or latch the digital voltage when the first control signal changes from the first signal to the second signal; and a digital-to-analog converter, configured to convert the digital voltage into an analog voltage, to obtain the first reference voltage.

13. The chip system according to claim 11, wherein the analog operation circuit comprises a comparator and a multiplexer;

the comparator is configured to compare the first reference voltage with a preset voltage, to output a second control signal, wherein the second control signal comprises a third signal or a fourth signal; and the multiplexer is configured to: select a difference between the first reference voltage and an offset voltage as the second reference voltage when the second control signal is the third signal, or select a fixed voltage as the second reference voltage when the second control signal is the fourth signal.

14. The chip system according to claim 11, wherein the analog operation circuit comprises an operational amplifier, a first resistor, a second resistor, a third resistor, and a variable resistor;

an end of the first resistor is coupled to a negative input terminal of the operational amplifier, an end of the second resistor is coupled to a positive input terminal of the operational amplifier, the third resistor is coupled between the negative input terminal of the operational amplifier and an output terminal of the operational amplifier, and the variable resistor is coupled between the positive input terminal of the operational amplifier and a ground terminal; and the other end of the first resistor is configured to receive the first reference voltage, the other end of the second resistor is configured to receive the offset voltage, and the output terminal of the operational amplifier is configured to output the second reference voltage.

* * * * *